March 21, 1961  E. C. HOLMES  2,975,521
AREA MEASURING DEVICE
Filed Dec. 30, 1953  2 Sheets-Sheet 1

INVENTOR.
Eugene C. Holmes
BY
McMorrow, Berman & Davidson
ATTORNEYS

March 21, 1961  E. C. HOLMES  2,975,521
AREA MEASURING DEVICE
Filed Dec. 30, 1953　　　　　　　　　　　　　　2 Sheets-Sheet 2
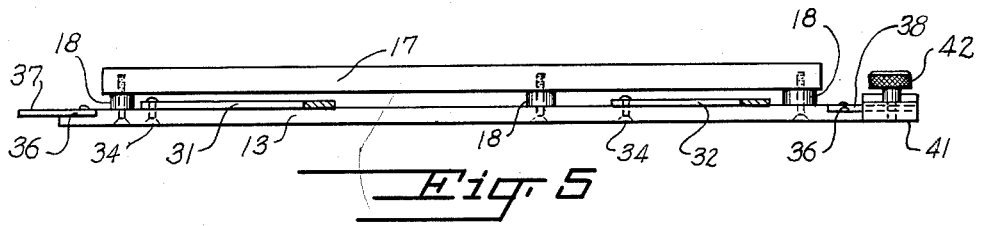
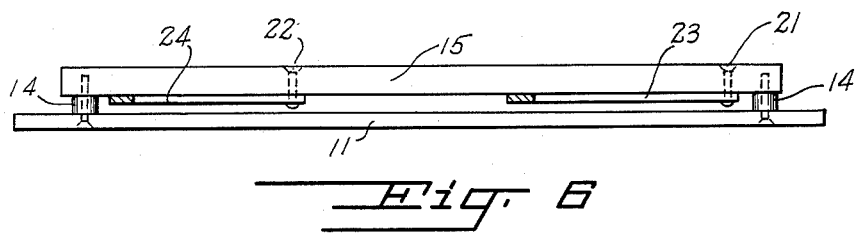
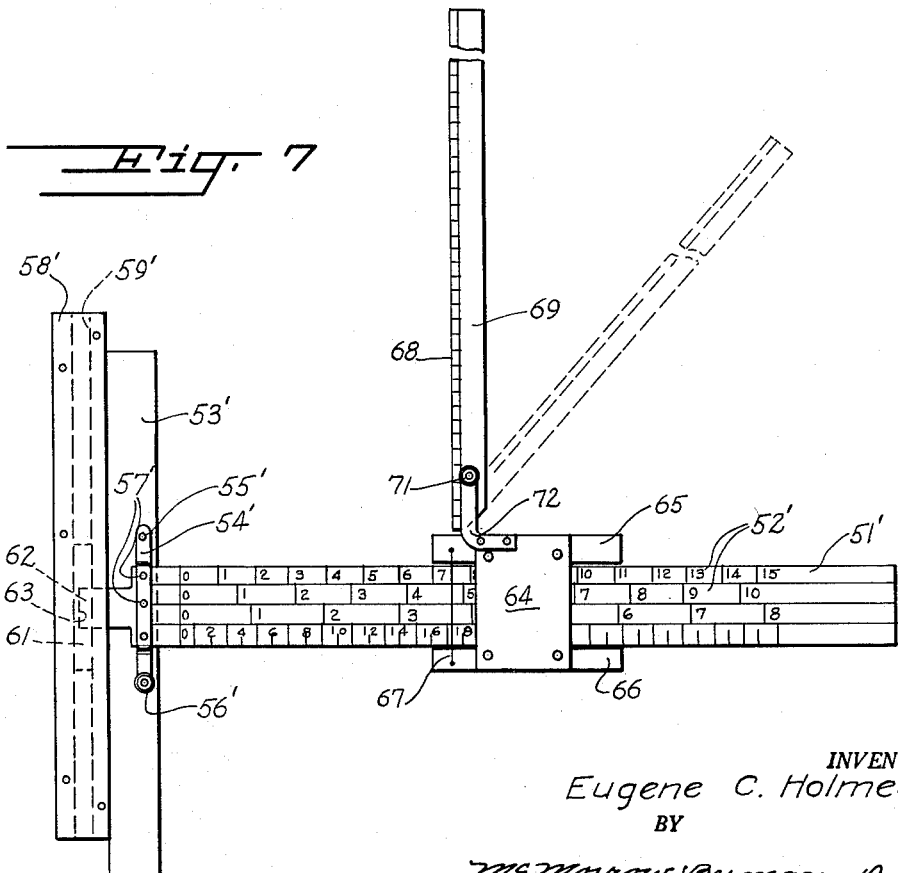
INVENTOR.
Eugene C. Holmes
BY
McMorrow, Berman + Davidson
ATTORNEYS ated Mar. 21, 1961

2,975,521
AREA MEASURING DEVICE
Eugene C. Holmes, Jonesville, Va.

Filed Dec. 30, 1953, Ser. No. 401,171

2 Claims. (Cl. 33—75)

The present invention relates to a device for determining the area of a polygon, and particularly to a device for finding the area of a triangle.

A main object of the invention is to provide a novel and improved device for determining the area of a polygon.

A further object of the invention is to provide an improved parallel ruler for directly determining the area of a triangle.

A still further object of the invention is to provide an improved parallel rule device so graduated as to permit direct determination of the area of a triangle, said device being accurate in operation and simple to use.

It is an additional object of this invention to provide an improved area measuring device which is rugged, simple in construction, and inexpensive to manufacture.

Further objects and advantages of the invention will become apparent from the following description and claims, and from the accompanying drawings, wherein:

Figure 5 is a section taken on the line 5—5 of Figure 2.

Figure 6 is a section taken on the line 6—6 of Figure 2.

Figure 7 is a plan view of a modification of my device.

Figure 1:
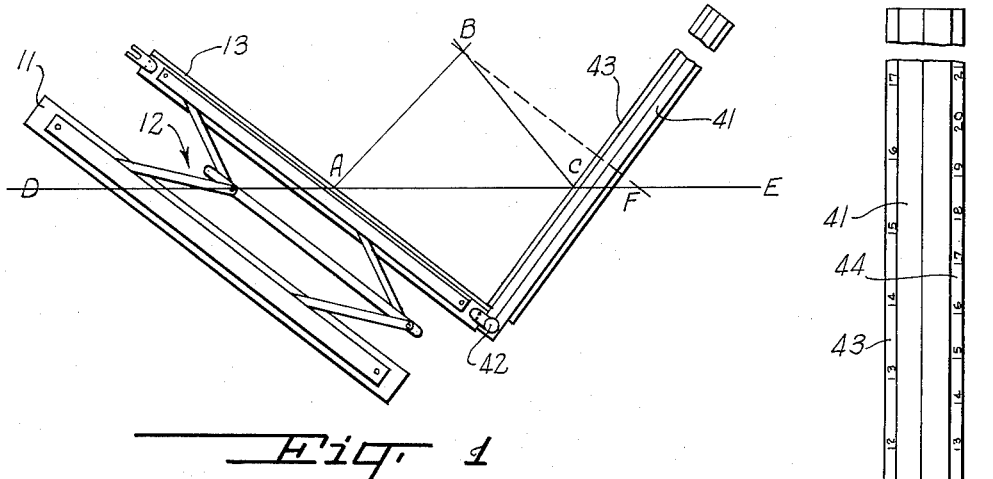
Figure 1 is a plan view of one embodiment of my improved device, showing the manner of using same to measure the area of a triangle.
Figure 2:
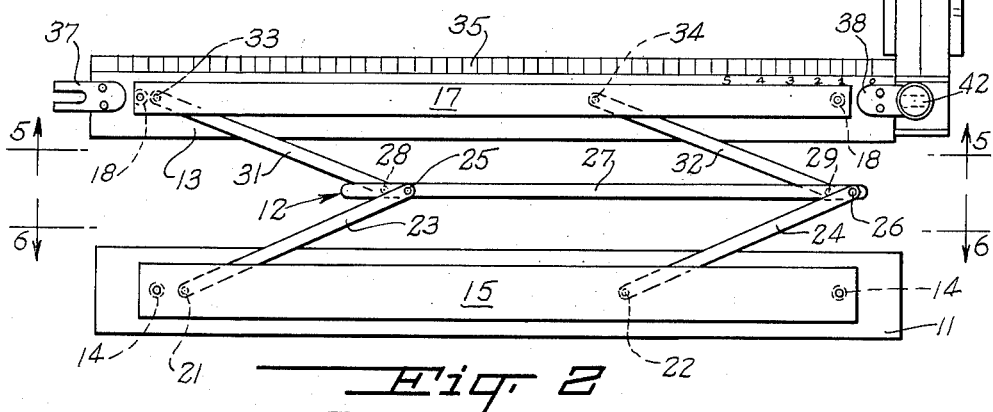
Figure 2 is an enlarged plan view of the embodiment of Figure 1.
Figure 3:
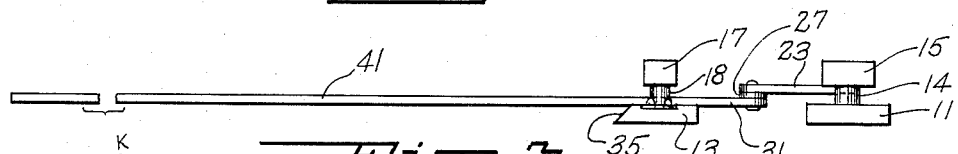
Figure 3 is an elevational view of the device of Figure 2.

Referring to the drawings, and particularly to Figures 1 to 6, there is illustrated an embodiment of the invention which comprises a first ruler 11, a parallel motion mechanism generally designated at 12 and hereinafter described, and a second ruler 13. Suitably secured to the ruler 11 and spaced thereabove by the spacers 14 is the bar 15. A similar bar 17 is secured to the ruler 13 and is spaced thereabove by the spacers 18.

Pivoted to the under surface of the bar 15, as at 21 and 22 respectively, are the first parallel links 23 and 24, pivoted at their respective other ends, as at 25 and 26, to the upper face of the bar 27. Pivotally secured beneath the bar 27, as at 28 and 29, are the parallel links 31 and 32 having their respective other ends pivoted to the ruler 13, as at 33 and 34. As is well understood in the art, the distance between pivots 21 and 22, 26 and 25, 28 and 29, and 33 and 34, are equal to one another, and the links 23, 24, 31 and 32 are of equal length, so that the rulers 11 and 13 remain parallel to one another in any adjusted position thereof.

The ruler 13 is beveled and is provided with suitable indicia, as at 35, and is provided at its ends with the recesses 36 in which are secured the lugs 37 and 38 having outwardly extending parallel leg portions. A ruler 41 abuts the end of ruler 13 and extends at right angles thereto. A thumb screw 42, threadedly engaged in the ruler 41, passes between the legs of the lugs 38 and frictionally engages the face of the lug to retain the ruler 41 in its extended position. Edges 43 and 44 are suitably calibrated in a manner hereinafter to be described.

In the device hereinbefore described, ruler 41 is fixedly held at right angles to the ruler 13. In the event it is desired to utilize the device for converting an irregular polygon to an equivalent triangle, by the process known as transversion and fully described on page 159, Trautwine, "Civil Engineer's Reference Book," 1937, published by Trautwine Co., Ithaca, New York, a suitable auxiliary ruler may be pivotally connected in any suitable manner to either lug 37 or 38 in place of the ruler 41. An irregular polygon may thus be graphically converted to an equivalent triangle by the above mentioned method of Trautwine, using a parallel rule and a pivoted auxiliary ruler, as above described. Assume that this has been done and that the resulting irregular triangle is ABC of Figures 1 and 4.

Figure 4:
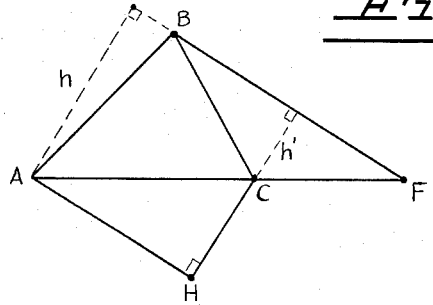
Figure 4 is a graphical construction showing how the area of the irregular triangle of Figure 1 can be measured by the device of the present invention.

In Figure 4, the line KF is drawn through point B parallel to the line AH, and the line HC is perpendicular to line AH. The extension $h'$ of line HC is also perpendicular to line BF. Line AK, or $h$, is perpendicular to line KF.

In Figure 4, the area of triangle $\overline{ABF}$ is given by $$\frac{h \times \overline{BF}}{2}$$

The area of triangle $\overline{ABC}$ is given by $$\frac{h \times \overline{BF}}{2} - \frac{h' \times \overline{BF}}{2}$$

or $$\frac{\overline{BF}}{2}(h-h')$$

but $$h-h'=\overline{HC}$$

Therefore $$\text{Area } \overline{ABC} = \frac{\overline{BF} \times \overline{HC}}{2}$$

The "reduction" scale 43 is calibrated in units representing the values HC divided by 2 in accordance with the scale to which the irregular triangle ABC is drawn. The "area" scale 35 on the ruler 13 is calibrated in units representing the values BF in accordance with the scale to which the triangle ABC is drawn. It will thus be seen that the scales 35 and 43 are calibrated so that the product of scale values on the respective scales is equal to the area of the right triangles defined by the points at which such scale values are taken with relation to the right angled connection between the rulers 41 and 13.

Thus, to find the area of triangle ABC using the device of the present invention, the ruler 41 is secured in position at right angles to the ruler 13 and the rulers 13 and 14 are positioned so that the edges thereof engage the respective apices A and C of the triangle, as shown in Figure 1, defining triangle AHC of Figure 4. The point of engagement of the apex C with the ruler 41 is preferably arbitrarily chosen, so that it coincides with one of the index marks on the scale 43, namely, the "reduction" scale. This mark is noted, and, holding the ruler 11 fixed, the ruler 13 is moved until it engages the apex B of the triangle, and a line BF is scribed from point B to the point F where ruler 13 intersects the extended base line DE. The line BF is then measured, using the scale on the ruler 13 which I term the area-scale. If the area-scale and the reduction scale are properly chosen to conform to the scale to which the triangle is drawn, then the area of the triangle can be determined by multiplying the length of the line BF, as determined by the scale on ruler 13, by the number of the index mark initially placed at C.

The scales on the respective members of the device are chosen in accordance with the scales employed on maps or similar representations such as those on which are found the unknown areas to be measured. Obviously, different maps may have different scales, so that the device may accordingly be provided with a corresponding number of different reduction scales, so that the device may be employed on a given map or similar object containing an unknown area by merely selecting the appropriate scale. Thus, for example, in the embodiment illustrated in Figure 2, the scale 35 may be in square feet, or similar area units and the "reduction" scale 43 may comprise numbers by which the measured quantities of scale 35 must be multiplied in order to determine the required area, in accordance with the procedure described above. Corresponding spaces on scale 43 will be twice as long as the respective spaces on the scale 35, since the area of a triangle is equal to the product of one-half its altitude times its base. Thus, if the scale in question comprises one inch equals twenty feet, the space on scale 43 corresponding to twenty feet would be twice as long as the corresponding space on the scale 35.

As is readily apparent, the scales 35 and 43 may be calibrated in any suitable manner, for example, in inches (for the scale 35) and in double-size units (2 inch units) on the scale 43, where each inch space on scale 35 represents a given length, in accordance with the scale employed on the map or other object containing the unknown area.

In using the device, the point of engagement of the apex C with the ruler 41 is preferably arbitrarily chosen so that it coincides with one of the index marks on the scale 43. In the next step, the ruler 11 is held fixed and the ruler 13 is moved until it engages the apex B of the triangle, whereupon a line BF is scribed from the point B to the point F where the ruler 13 intersects the extended base line DE. The line BF is then measured, using the scale on the ruler 13. In order to measure this distance, it is desirable that the ruler 13 be placed so that the point B coincides with a convenient point on the scale 35, for example, a zero point or a point representing the beginning of a whole calibration space. It is therefore desirable to be able to shift the ruler 13 along its length so that the point B may coincide with a convenient point from which the measurement of the line BF may be made. The linkage connecting the ruler 13 to the ruler 11 allows for the desired longitudinal shifting of the ruler 13 at this stage of the process. By the provision of the double parallelogram linkage employed in the device, the above desired feature may be obtained. Thus, the double parallelogram linkage comprising the link bars 31, 32, the longitudinal link 27, and the link bars 23, 24 maintains the ruler 13 parallel at all times to the ruler 11 but allows the ruler 13 to be shifted longitudinally, as required, without being affected by the location of the ruler 11, which is maintained fixed.

By the provision of the respective end lugs 37, 38 on the opposite ends of the ruler 13, the ruler 41 may be secured at right angles to either opposite end, greatly increasing the range of action of the device and enabling it to be employed with a wide range of different shaped polygons.

In the modified form of my device, illustrated in Figure 7, there is provided a ruler 51', having scribed thereon a plurality of scales 52', which correspond to the reduction scale in the embodiment described above. The ruler 51' is secured to the cross bar 53' by a U-shaped clamp 54', pivoted to the cross bar 53', as at 55, and removably held at the other end by a thumb screw 56'. Pins 57' extending upwardly from the ruler 51' engage in aligned openings in the clamp 54' and serve to retain ruler 51' at right angles to cross bar 53'. Parallel to the cross bar 53' is a slide bar 58' having a groove 59' formed therein, in which is slidably engaged a slide block 61 fixed to cross bar 53'. Tongue 62, integral with ruler 51', engages in a recess 63 in slide block 61 and serves to additionally support the ruler 51'.

Mounted for sliding movement on the ruler 51' is the index slide 64 having the side bars 65 and 66 slidably engaging the edges of the ruler. A cross hair 67 extends between the bars 65 and 66 and is aligned with the edge 68 of a ruler 69 threadedly supported on a thumb screw 71 pivoted on the bracket arm 72 and suitably supported on the index slide 64. The ruler 69 may be positioned at any desired angle relative to the ruler 51', in which position it may be retained by the thumb screw 71.

The manner of using the modification described above will be evident from the foregoing description, it being understood that the scales 52' are the equivalent of the "reduction" scales on edges 43, 44, and the scale 68 is the equivalent of the area scale 35 of the device of Figure 1. By placing the zero mark on one apex of a triangle and moving the index slide 64 until the ruler 69 engages on the other apex, the appropriate reduction scale may be read under the hairline. Thereafter, with the slide bar 58' held fixed, the cross bar may be moved lengthwise of the slide bar, and the index slide moved along ruler 51' until scale 68 engages the third apex of the triangle, the area being determined in the same manner as with the device of Figure 1.

While certain specific embodiments of area measuring devices have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a device of the character described for measuring the area of an irregular triangle, a first ruler having a linear scale thereon, a second ruler having a linear scale thereon, respective lugs secured to the opposite ends of said first ruler, said lugs each having spaced parallel leg elements, means on an end of said second ruler engageable between the leg elements of a selected one of said lugs and being constructed and arranged to rigidly secure said second ruler to the adjacent end of the first ruler at right angles thereto, said scale being calibrated so that the product of scale values on the respective scales is equal to the area of the right triangles defined by the points at which said scale values are taken with relation to the right-angled connection between the rulers, a third ruler, and a plurality of spaced parallel pairs of link bars interconnected to define a parallel motion linkage and further interconnecting said first and third rulers for parallel movement relative to each other.

2. In a device of the character described for measuring the area of an irregular triangle, a first ruler having a linear scale thereon, a second ruler having a linear scale thereon, respective lugs secured to the opposite ends of said first ruler, said lugs each having spaced parallel leg elements, means on an end of said second ruler engageable between the leg elements of a selected one of said lugs and being constructed and arranged to rigidly secure said second ruler to the adjacent end of the first ruler at right-angles thereto, said scales being calibrated so that the product of scale values on the respective scales is equal to the area of the right triangles defined by the points at which said scale values are taken with relation to the right-angled connection between the rulers, a third ruler, and a parallel motion linkage interconnecting said first and third rulers, said parallel motion linkage comprising a bar located midway between and parallel to said first and third rulers, a first pair of spaced link arms of equal length connecting said bar to said third ruler, and a second pair of spaced parallel link arms similar in length to the first link arms, connecting said bar to said first ruler.

References Cited in the file of this patent

UNITED STATES PATENTS

| | | |
|---|---|---|
| Re. 2,220 | Simpson | Apr. 3, 1886 |
| 45,535 | Taylor | Dec. 20, 1864 |
| 682,452 | Buhner | Sept. 10, 1901 |
| 1,065,242 | Hardsocg | June 17, 1913 |
| 1,095,552 | Colpitts | May 5, 1914 |

FOREIGN PATENTS

| | | |
|---|---|---|
| 919,637 | France | Dec. 9, 1946 |